United States Patent
Bruchmann et al.

(10) Patent No.: US 7,268,203 B2
(45) Date of Patent: Sep. 11, 2007

(54) POLYMER DISPERSANT HAVING HYPERBRANCHED STRUCTURES

(75) Inventors: Bernd Bruchmann, Freinsheim (DE); Martin Könemann, Mannheim (DE); Ulrike Hees, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 288 days.

(21) Appl. No.: 10/473,210

(22) PCT Filed: Mar. 28, 2002

(86) PCT No.: PCT/EP02/03500

§ 371 (c)(1),
(2), (4) Date: Sep. 29, 2003

(87) PCT Pub. No.: WO02/081071

PCT Pub. Date: Oct. 17, 2002

(65) Prior Publication Data

US 2004/0097685 A1  May 20, 2004

(30) Foreign Application Priority Data

Apr. 4, 2001 (DE) ................. 101 16 767

(51) Int. Cl.
*C08G 18/10* (2006.01)
*C08G 18/28* (2006.01)

(52) U.S. Cl. ............... 528/60; 528/77; 528/85; 525/457; 525/458; 525/460; 523/160; 523/161; 106/31.13; 106/31.6; 106/31.75; 106/31.85

(58) Field of Classification Search ............ 106/31.13, 106/31.6, 31.75, 31.85; 528/60, 77, 85; 525/457, 525/460, 458; 523/160, 161
See application file for complete search history.

(56) References Cited

U.S. PATENT DOCUMENTS

| | | | |
|---|---|---|---|
| 4,666,984 A * | 5/1987 | Carlick et al. | 525/131 |
| 5,561,214 A | 10/1996 | Yeske et al. | |
| 5,981,684 A * | 11/1999 | Bruchmann et al. | 528/45 |
| 6,096,801 A | 8/2000 | Vincent et al. | |
| 6,376,637 B1 | 4/2002 | Bruchmann et al. | |
| 6,534,600 B2 * | 3/2003 | Dvornic et al. | 525/474 |
| 6,632,914 B2 * | 10/2003 | Bruchmann et al. | 528/59 |
| 6,897,266 B2 * | 5/2005 | Kenig-Dodiuk | 525/459 |
| 2003/0004293 A1 * | 1/2003 | Dvornic et al. | 528/10 |
| 2003/0092797 A1 * | 5/2003 | Wang et al. | 523/161 |

FOREIGN PATENT DOCUMENTS

| | | |
|---|---|---|
| EP | 1026185 | 8/2000 |
| WO | 00/37542 | 6/2000 |
| WO | 01/10923 | 2/2001 |
| WO | 02/36695 | 5/2002 |

OTHER PUBLICATIONS

Derwent ABST CA 136:371211, 2002.

* cited by examiner

*Primary Examiner*—Philip C. Tucker
(74) *Attorney, Agent, or Firm*—Novak Druce & Quigg, LLP

(57) ABSTRACT

Polyurethanes having hyperbranched structures, selected from hyperbranched polyurethanes containing at least one pigment affinity group and modified hyperbranched polyurethanes, are used as polymeric dispersing additives for pigments. A preferred process for preparing modified polymeric dispersing additives comprises reacting a hyperbranched polyurethane having from 2 to 100 NCO groups and a molar mass of from 500 to 50,000 g/mol with one or more polyether derivatives.

11 Claims, No Drawings

POLYMER DISPERSANT HAVING HYPERBRANCHED STRUCTURES

This application is a 371 of PCT/EP02/03500 filed Mar. 28, 2002.

The present invention relates to the use of polyurethanes having hyperbranched structures, selected from hyperbranched polyurethanes containing at least one pigment affinity group and modified hyperbranched polyurethanes, as polymeric dispersing additives for pigments.

The present invention relates specifically to a process for preparing modified polymeric dispersing additives which comprises reacting a hyperbranched polyurethane having from 2 to 100 NCO groups and a molar mass of from 500 to 50,000 g/mol with one or more polyether derivatives selected from polyethylene glycol derivatives of the formula I

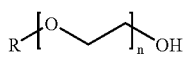

and polyTHF derivatives of the formula II

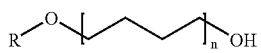

where in each case
R is selected from hydrogen or $C_1$-$C_{40}$ alkyl or $C_7$-$C_{13}$ aralkyl or $C_6$-$C_{14}$ aryl and
n is an integer from 2 to 500, preferably from 2 to 200, and copolymers of ethylene oxide and propylene oxide or butylene oxide or terpolymers of ethylene oxide and propylene oxide and butylene oxide, it being possible for said polymers to be branched.

Dispersing additives are of great technical and economic importance in numerous applications in which pigments are to be durably affixed to surfaces. These additives must on the one hand satisfy the customarily stringent technical requirements and on the other hand be preparable at reasonable prices.

The technical requirements include:
flocculation stability, i.e., the pigment particles should not agglomerate in pastes or coating materials, even in the course of prolonged storage;
good rheology, i.e., a low flow point and a relatively low viscosity at the same or higher pigment content;
effective assistance to the optical properties, which include high color strength, high gloss, high chroma, good lightness, high transparency, and alterable shades, expressed in high hue values.

These properties are particularly critical in solventborne coating systems, in low-solvent coating materials, and in waterborne coating materials, and also in high-solids coating systems. Solventborne and waterborne coating systems, low-solvent coating materials, and high-solids coating systems are formulations which in addition to a pigment normally comprise at least one dispersing additive and one binder.

Whereas the pigments themselves are not now investigated greatly and use is made of the widely known organic or inorganic pigments, the dispersing additives are of great interest at present. Besides the properties of the dispersing additive per se, an important part is played by the combination with the respective binder, with which the dispersing additives are required to harmonize. For instance, binder and dispersing additive must in no case be incompatible, since otherwise there may be spontaneous separation of the respective formulation, thereby rendering it useless for industrial applications.

U.S. Pat. No. 6,096,801 discloses pigment formulations containing from 0.1 to 10 percent by weight of pigment and a resin, e.g., rosin, with dendrimers based on acetoacetmetaxylides, such as the BOLTORN® grades, or β-aminopropionamides. The disclosed dendrimers may be reacted at the ends of the arms with molecules which carry two or more hydroxyl groups, an example being pentaerythritol. They are highly suitable as dispersing additives but are complex to synthesize, and the formulations prepared using dendrimers are therefore disadvantageous from an economic standpoint.

WO 00/37542 likewise discloses the use of selected dendrimers as dispersants for hydrophobic particles in aqueous systems. As regards economy, the comments made above apply.

U.S. Pat. No. 5,561,214 discloses hyperbranched polyaspartate esters prepared by self-condensation of hydroxyaspartate esters. The hyperbranched polyaspartates may either be used as they are, and are suitable as binders, or they are reacted with polyisocyanates to give polyureas which are suitable as binders for a variety of coating systems. For economic use as dispersing additives, however, they are generally too expensive to prepare.

It is an object of the present invention to provide novel dispersing additives which offer the technical advantages set out above and are easy to synthesize. A further object is to provide a process for preparing the novel dispersing additives, and a final object is to provide uses for the dispersing additives and the dispersions thereby obtainable.

We have found that these objects are achieved by the polyurethanes defined at the outset, having hyperbranched structures. The preparation of polyurethanes having hyperbranched structures, also referred to below as hyperbranched polyurethanes, and their modification are described below.

For the purposes of the present invention, polyurethanes include not only polymers linked exclusively by urethane groups but also, in a more general sense, polymers obtainable by reacting diisocyanates or polyisocyanates with compounds containing active hydrogen atoms. Polyurethanes in the sense of the present invention may therefore contain not only urethane groups but also urea, allophanate, biuret, carbodiimide, amide, ester, ether, uretonimine, uretdione, isocyanurate or oxazolidine groups. An example of one overview that may be mentioned is that constituted by Kunststoffhandbuch [Plastics Handbook]/Saechtling, 26th Edition, Carl-Hanser-Verlag, Munich 1995, page 491 ff. In particular, polyurethanes in the sense of the present invention contain urea groups.

The present invention starts from hyperbranched polyurethanes which are molecularly and structurally nonuniform. They differ from dendrimers in their molecular nonuniformity and are much less expensive to prepare.

For the synthesis of the hyperbranched polyurethanes used to implement the present invention may be conducted, for example, as depicted below.

For the synthesis of the hyperbranched polyurethanes it is preferred to use $AB_x$ monomers containing both isocyanate groups and groups which may react with isocyanate groups to form a link. x is preferably a natural number from 2 to 8.

x is preferably 2 or 3. Either A comprises isocyanate groups and B groups reactive therewith, or vice versa.

The groups that are reactive with the isocyanate groups preferably comprise OH, $NH_2$, NH, SH or COOH groups.

The $AB_x$ monomers are preparable conventionally by means of a variety of techniques.

$AB_x$ monomers may be synthesized, for example, by the method disclosed in WO 97/02304, using protective group techniques. By way of example, this technique is explained for the preparation of an $AB_2$ monomer from tolylene 2,4-diisocyanate (TDI) and trimethylolpropane. First of all, one of the isocyanate groups of the TDI is blocked in a known manner, by reaction with an oxime, for example. The remaining free NCO group is reacted with trimethylolpropane, one of the three OH groups reacting with the isocyanate group. After the protective group has been eliminated, a molecule containing one isocyanate group and two OH groups is obtained.

The $AB_x$ molecules may be synthesized with particular advantage by the method disclosed in DE-A 199 04 444, where no protective groups are needed. In this method, diisocyanates or polyisocyanates are used and are reacted with compounds containing at least two isocyanate-reactive groups. At least one of the reactants contains groups whose reactivity differs from that of the other reactant. Preferably, both reactants contain groups whose reactivity differs from that of the other reactant. The reaction conditions are chosen so that only specific reactive groups can react with one another.

Preferred diisocyanates and/or polyisocyanates containing NCO groups of different reactivity are, in particular, readily and cheaply available isocyanates, examples being aromatic isocyanates such as tolylene 2,4-diisocyanate (2,4-TDI), diphenylmethane 2,4'-diisocyanate (2,4'-MDI), triisocyanatotoluene, or aliphatic isocyanates, such as isophorone diisocyanate (IPDI), 2-butyl-2-ethylpentamethylene diisocyanate, 2-isocyanatopropylcyclohexyl isocyanate, 2,4,4- or 2,2,4-trimethylhexamethylene diisocyanate, methylenebis (cyclohexyl) 2,4'-diisocyanate, and 4-methylcyclohexane 1,3-diisocyanate (H-TDI).

Further examples of isocyanates containing groups of different reactivity are phenylene 1,3-diisocyanate, phenylene 1,4-diisocyanate, naphthylene 1,5-diisocyanate, biphenyl diisocyanate, toluidine diisocyanate, and tolylene 2,6-diisocyanate.

It is of course also possible to use mixtures of said isocyanates.

Preferred compounds used containing at least two isocyanate-reactive groups are compounds with a functionality of two, three or four whose functional groups differ in their reactivity toward NCO groups. Preferred compounds are those containing at least one primary and at least one secondary hydroxyl group, at least one hydroxyl group and at least one mercapto group, with particular preference containing at least one hydroxyl group and at least one amino group, in the molecule, especially amino alcohols, amino diols, and amino triols, since the reactivity of the amino group in the reaction with isocyanate is substantially higher than that of the hydroxyl group.

Examples of said compounds containing at least two isocyanate-reactive groups differing in their reactivity include propylene glycol, glycerol, mercaptoethanol, ethanolamine, N-methylethanolamine, diethanolamine, ethanolpropanolamine, dipropanolamine, diisopropanolamine, 2-amino-1,3-propanediol, 2-amino-2-methyl-1,3-propanediol or tris(hydroxymethyl)aminomethane. Furthermore, mixtures of said compounds may also be used.

The preparation of an $AB_2$ molecule is explained by way of example for the case of the diisocyanate with an amino diol. Here, first one mole of a diisocyanate is reacted with one mole of an amino diol, such as 2-amino-1,3-propanediol, at low temperatures, preferably in the range between −10 to 30° C. Within this temperature range, suppression of the urethane formation reaction is virtually complete, and the NCO groups of the isocyanate react exclusively with the amino group of the amino diol. The $AB_2$ molecule formed contains one free NCO group and two free OH groups and may be used to synthesize a hyperbranched polyurethane.

By heating or addition of catalyst, this $AB_2$ molecule may undergo intermolecular reaction to give a hyperbranched polyurethane. Examples of catalysts used to prepared the hyperbranched polyurethanes include organotin compounds such as tin diacetate, tin dioctoate, dibutyltin dilaurate or strongly basic amines such as diazabicyclooctane, diazabicyclononane, diazabicycloundecane, triethylamine, pentamethyldiethylenetriamine, tetramethyldiaminoethyl ether or, preferably, triethylenediamine or bis(N,N-dimethylaminoethyl)ether or else further basic compounds such as substituted imidazoles, for example. It is also possible to use mixed catalysts comprising at least one organotin compound and at least one strongly basic amine. The catalysts are used preferably in an amount of from 0.01 to 10% by weight, more preferably from 0.05 to 5% by weight, based on isocyanate. The synthesis of the hyperbranched polyurethane takes place advantageously without prior isolation of the $AB_2$ molecule in a further reactant step at elevated temperature, preferably in the range between 30 and 80° C. When using the above-described $AB_2$ molecule containing two OH with one NCO group, a hyperbranched polymer is formed which contains per molecule one free NCO group and also a number of OH groups that is dependent on the degree of polymerization. The reaction may be carried out to high conversions, with the result that very high molecular weight structures are obtained. It is preferably terminated by adding suitable monofunctional compounds or by adding one of the starting compounds for preparing the $AB_2$ molecule when the desired molecular weight has been reached. Depending on the starting compound used for termination, either fully NCO-terminated or fully OH-terminated molecules are produced.

Alternatively, for example, an $AB_2$ molecule may also be prepared from one mole of glycerol and 2 mol of TDI. At a low temperature, the primary alcohol groups and also the isocyanate group in position 4 react preferentially, and an adduct is formed that contains one OH group and two isocyanate groups and which, as described, may be reacted at relatively high temperatures to form a hyperbranched polyurethane. The initial product is a hyperbranched polyurethane which contains one free OH group and an average number of NCO groups that is dependent on the degree of polymerization.

The number of NCO groups per molecule is from 2 to 100, preferably from 3 to 20, and with particular preference up to 10.

The molar mass $M_w$ of the hyperbranched polyuretbanes to be used for the present invention is from 500 up to a maximum of 50,000 g/mol, preferably a maximum of 15,000 g/mol, with particular preference a maximum of 10,000 g/mol, and with very particular preference 5000 g/mol.

The preparation of the hyperbranched polyurethanes may in principle be carried out without solvents, but preferably in solution. Solvents which are suitable in principle are all compounds which are liquid at the reaction temperature and are inert toward the monomers and polymers.

Other products are obtainable by further synthesis variants. By way of example, mention may be made at this point of $AB_3$ molecules. $AB_3$ molecules may be obtained, for example, by reacting diisocyanates with compounds containing 4 isocyanate-reactive groups. One example that may be mentioned is the reaction of tolylene diisocyanate with tris(hydroxymethyl)aminomethane.

To terminate the polymerization it is possible to use polyfunctional compounds which are able to react with the respective A groups. In this way it is possible to link a plurality of small hyperbranched molecules to form one large hyperbranched molecule.

Hyperbranched polyurethanes having chain-extended branches may be obtained, for example, by conducting the polymerization reaction using not only $AB_x$ molecules but also, in a molar ratio of 1:1, a diisocyanate and a compound containing two isocyanate-reactive groups. These additional AA and BB compounds, respectively, may also possess further functional groups which, however, must not be reactive toward the A or B groups under the reaction conditions. In this way it is possible to introduce further functionalities into the hyperbranched polymer.

Further synthesis variants for hyperbranched polyurethanes can be found in our applications bearing the file references DE 100 13 187.5 and DE 100 30 869.4, unpublished at the priority date of the present specification.

With particular advantage, the functional groups may be hydrophobicized, hydrophilicized, or converted. This makes it possible to obtain polymers especially adapted to the particular application of the dispersing additives, and pigment affinity groups (i.e., groups having affinity for pigment) are introduced. For conversion of functionality, very particular suitability is possessed, owing to their reactivity, by hyperbranched polyurethanes which contain isocyanate groups. It is of course also possible to convert OH— or $NH_2$-terminated polyurethanes by means of appropriate reactants.

Examples of pigment affinity groups which are introduced by means of appropriate reactants are —COOH, —COOR', —CONHR', —$CONH_2$, —OH, —SH, —$NH_2$, —NHR', —$NR'_2$, —$SO_3H$, —$SO_3R'$, —N(phthalimide), —NH-COOR', —$NHCONH_2$, —NHCONHR' or —CN. The radicals R' of said groups are straight-chain or branched alkyl radicals, aralkyl radicals, or aryl radicals, which may also be further substituted, by $C_1$-$C_{40}$ alkyl radicals or by $C_6$-$C_{14}$ aryl radicals, for example. The following radicals are particularly preferred:

$C_1$-$C_{40}$ alkyl, examples being methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, n-dodecyl, n-hexadecyl, and n-eicosyl; methyl is particularly preferred;

$C_6$-$C_{14}$ aryl, examples being phenyl, α-naphthyl, β-naphthyl, 1-anthracenyl, 2-anthracenyl, and 9-anthracenyl, $C_7$-$C_{13}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, neophyl(1-methyl-1-phenylethyl), 1-phenylbutyl, 2-phenylbutyl, 3-phenylbutyl, and 4-phenylbutyl, with particular preference benzyl.

Groups which possess acidic hydrogen atoms may be converted into the corresponding salts by treatment with appropriate bases such as diethanolamine or triethanolamine, for example. Similarly, basic groups may be converted into the corresponding salts using suitable acids such as α-hydroxy carboxylic acids or α-amino acids or else α-hydroxy sulfonic acids. By this means it is possible to obtain water-soluble hyperbranched polyurethanes.

Hydrophobicized products may be obtained by reacting NCO-terminated products with aliphatic or aromatic alcohols, thiols, primary or secondary amines or carboxylic acids. Particularly suitable are alcohols and primary and secondary amines having $C_8$-$C_{40}$ alkyl radicals and/or $C_6$-$C_{14}$ aryl radicals, the radicals being as defined above, or having heteroaromatic groups such as α-pyridyl, β-pyridyl, γ-pyridyl, N-pyrryl, α-pyrryl, β-pyrryl, porphyrinyl, 2-furanyl, 3-furanyl, 2-thiophenyl, 3-thiophenyl, N-pyrazolyl, N-imidazolyl, N-triazolyl, N-oxazolyl, N-indolyl, N-carbazolyl, 2-benzofuranyl, 2-benzothiophenyl, N-indazolyl, benzotriazolyl, 2-quinolinyl, 3-isoquinolinyl or α-phenanthrolinyl, for example.

Very particular preference is given to aromatic amines such as aniline or α-naphthylamine, for example; examples of particularly suitable carboxylic acid derivatives are carboxylic acids and carboxamides of aliphatic $C_2$-$C_{16}$ monocarboxylic or dicarboxylic acids and aromatic $C_6$-$C_{14}$ mono or dicarboxylic or dicarboxylic acids. The reaction with phthalimide is of very particular preference.

Acid groups may be introduced, for example, by reaction with hydroxy carboxylic acids, mercapto carboxylic acids, hydroxy sulfonic acids or amino acids. Examples that may be mentioned as suitable reactants are hydroxyacetic acid, hydroxypivalic acid, 4-hydroxybenzoic acid, 12-hydroxydodecanoic acid, 2-hydroxyethanesulfonic acid, mercaptoacetic acid, dimethylolpropionic acid, glycine, β-alanine and taurine.

The above-described hyperbranched polyurethanes may be used as dispersing additives in accordance with the invention if they contain at least one hydrophilic group selected from —COOH, —CONHR', —$CONH_2$ —OH, —SH, —$NH_2$, —NHR', —$NR'_2$, —$SO_3H$, —$SO_3R'$, —NHCOOR' and —$NHCONH_2$.

Preference is given to the hydrophilic modification of the above-described hyperbranched polyurethanes for the preparation of modified polymeric dispersing additives. The present invention accordingly provides for the use of hyperbranched polyurethanes and, preferably, of hydrophilically modified hyperbranched polyurethanes as dispersing additives. The present invention further provides a process for preparing novel modified polymeric dispersing additives using the hyperbranched polyurethanes described above.

Hydrophilicized but nonionic products may be obtained preferably by reacting NCO-terminated polymers with polyether alcohols, such as di-, tri- or tetra- or polyethylene glycol, for example; particular preference here, however, is given to the reaction with polyethylene oxide alcohols which are monofunctional with respect to OH groups.

The process of the invention comprises reacting the above-described hyperbranched polyurethanes containing from 0 to 100 hydrophilic groups with a polyether derivative or with a mixture of at least two polyether derivatives.

For the purposes of the present invention, polyether derivatives are, for example, compounds of the formula I

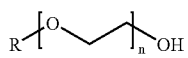

in which the variables are as defined below.
R is selected from hydrogen or, preferably, $C_1$-$C_{40}$ alkyl, examples being methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, n-dodecyl, n-hexadecyl, and n-eicosyls; methyl is particularly preferred;

$C_6$-$C_{14}$ aryl, examples being phenyl, α-naphthyl, β-naphthyl, 1-anthracenyl, 2-anthracenyl, and 9-anthracenyl;

$C_7$-$C_{13}$ aralkyl, preferably $C_7$— to $C_{12}$ phenylalkyl such as benzyl, 1-phenethyl, 2-phenethyl, 1-phenylpropyl, 2-phenylpropyl, 3-phenylpropyl, neophyl(1-methyl-1-phenylethyl), 1-phenylbutyl, 2-phenylbutyl, 3-phenylbutyl, and 4-phenylbutyl, with particular preference benzyl.

n is an integer from 2 to 500, preferably from 2 to 200, with particular preference from 5 to 100, and with very particular preference up to 50.

For the purposes of the present invention, polyether derivatives further include polyTHF derivatives of the formula II

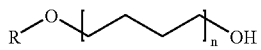
II in which the variables are as defined above.

For the purposes of the present invention, polyether derivatives additionally include copolymers of ethylene oxide and propylene oxide or butylene oxide or terpolymers of ethylene oxide and propylene oxide and butylene oxide, it being possible for the copolymers to be present in the form of block copolymers or random copolymers and/or terpolymers. The molar ratios of the monomers are not critical. Examples of block copolymers are the Pluronics® grades from BASF Aktiengesellschaft. Finally, for the purposes of the present invention, polyether derivatives also embrace the Tetronics® grades from BASF Aktiengesellschaft, which are branched block copolymers of ethylene oxide and Propylene oxide in which branching takes place by incorporation of one ethylenediamine unit per molecule.

For the purposes of the present invention, preferred polyethylene glycol derivatives are monomethyl-blocked compounds of the formula I.

The reaction of the hyperbranched polyurethanes with the polyethylene glycol derivatives takes place usually at temperatures from −20 to +60° C. The reaction may be carried out by adding a catalyst. Catalysts used to prepare the modified polyurethanes of the invention include:

organotin compounds such as tin diacetate, tin dioctoate or dibutyltin dilaurate, for example, or strongly basic amines such as diazabicyclooctane, diazabicyclononane, diazabicycloundecane, triethylamine, pentamethyldiethylenetriamine, tetramethyldiaminoethyl ether, or, preferably, triethylenediamine or bis(N,N-dimethylaminoethyl) ether or else weakly basic amines such as imidazole, for example.

It is also possible to use mixed catalysts comprising at least one organotin compound and at least one strongly basic amine. The catalysts are used preferably in an amount of from 0.01 to 10% by weight, more preferably from 0.05 to 5% by weight. The reaction may be conducted in a solvent, suitable solvents including in principle all those which react neither with the polyurethane nor with the polyethylene glycol derivative.

The molar ratio of the reactants influences the dispersing properties of the polymer. The molar proportions may be chosen so that one NCO group is used per equivalent of OH groups of the polyethylene glycol derivative. It is, however, also possible to use a substoichiometric amount of OH group equivalents and then to react the unreacted NCO groups of the hyperbranched polyurethane with alkanols, arylamines or alkylamines, especially alkanols and alkylamines having $C_8$-$C_{40}$ alkyl radicals or arylamines having $C_6$-$C_{14}$ aryl radicals, such as aniline or α-naphthylamine, for example, to give hydrophobicized products.

The present invention additionally provides polymeric dispersing additives obtainable by the process described above.

Where it is desired to use the above-described polymeric dispersing additives or the modified polymeric dispersing additives of the invention in coating systems, it is preferable to attach the polymeric dispersing additive or the modified polymeric dispersing additive to a polymer by covalent bonding. Polymers used are structures of the formula III $$U-(M)_y-T \qquad \qquad III$$

where

U is selected from hydrogen, $C_1$-$C_{18}$ alkyl, branched or unbranched, e.g., methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, n-dodecyl, and n-octadecyl; preferably $C_1$-$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$-$C_4$ alkyl such as methyl, ethyl, n-propyl, isopropyl, n-butyl, isobutyl, sec-butyl, and tert-butyl;

$C_6$-$C_{14}$ aryl, e.g., phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, with particular preference phenyl;

$C_7$-$C_{13}$ aralkyl, preferably $C_7$- to $C_{12}$ phenylalkyl such as benzyl, 1-phenethyl, 2-phenethyl, 1-phenylpropyl, 2-phenylpropyl, 3-phenylpropyl, neophyl(1-methyl-1-phenylethyl), 1-phenylbutyl, 2-phenylbutyl, 3-phenylbutyl, and 4-phenylbutyl, with particular preference benzyl;

or a residue of an initiator molecule, such as 2,2-dimethyl-2-cyanoethyl, or of another initiator molecule such as the common organic peroxides, organic azo compounds, or C—C-cleaving initiators such as dialkyl peroxides, peroxocarboxylic acids, peroxydicarbonates, peroxide esters, hydroperoxides, ketone peroxides, azo dinitriles or benzpinacol silyl ethers:

M stands for one or more different monomer units, examples being (meth)acrylic units, acrylamide units, polyvinyl acetate units, polyvinyl alcohol units or polyethyleneimide units, linear polyurethanes, polyester units, polystyrene units, polyether units such as polyTHF units, polyethylene or polyamide units;

y is an integer from 10 to 100,000, preferably from 100 to 10,000, and

T is functional groups which are able to react with the NCO groups or OH—, NH— or SH groups of the polymeric dispersing additives of the invention, examples being OH, NHR, SH, carboxyl or carboxylamide groups.

Where the above-described polymeric dispersing additives or the modified polymeric dispersing additives of the invention contain one or more free NCO groups, T is chosen from OH, NHR, and SH. Where the above-described polymeric dispersing additives or the modified polymeric dispersing additives of the invention contain one or more free OH—, NH— or SH groups, T is preferably-selected from carboxyl groups.

Reacting the polymeric dispersing additives or the modified polymeric dispersing additives of the invention with one or more equivalents of the polymer gives a polymeric dispersant. The present invention provides a process for preparing polymeric dispersants from the above-described polymeric dispersing additives or the modified polymeric dispersing additives of the invention, and also the polymeric dispersants obtainable in this way. The polymeric dispersants of the invention are ideally suited to the dispersing of organic and inorganic pigments, especially organic pigments, in high-solids coating systems and in solventborne coating materials, in which context solvents are to be understood as being nonaqueous solvents. The dispersants of the invention are further ideally suited to use in low-solvent coating materials—that is, coating materials containing less than 5% by volume solvent—and in solvent-free coating materials. Very particularly, the polymeric dispersants of the invention are suitable for use in waterborne coating materials. Effective dispersion may be achieved in particular with the following pigments:

Pigments from the class of the quinacridone pigments such as P.R. 122, P.R. 202, P.V. 19,
quinophthalone pigments such as P.Y. 138,
isoindoline pigments such as P.O. 69, P.O. 61, P.Y. 139, P.Y. 185,
perylene pigments such as P.R. 123, P.R. 149, P.R. 178, P.R. 179, P.R. 224, P.V. 29,
phthalocyanine pigments such as P.B. 15, P.B. 15:1, P.B. 15:2, P.B. 15:3, P.B. 15:4, P.B. 15:6 and P.B. 16, P.G. 7 and P.G. 36,
indanthrone pigments such as P.B. 60 and P.B. 64,
dioxazine pigments such as P.V. 23,
triarylcarbonium pigments such as P.V. 27,
disazo pigments such as P.O. 34, P.R. 144, P.R. 166, P.Y. 12, P.Y. 13, P.Y. 17, P.Y. 83, P.Y. 113 and P.Y. 126,
monoazo pigments such as P.O. 5, P.O. 36, P.O. 67, P.R. 1, P.R. 2, P.R. 3, P.R. 48:4, P.R. 49, P.R. 52:2, P.R. 53, P.R. 57:1, P.R. 251, P.R. 112, P.R. 170, P.R. 184, P.R. 190,
thioindigo pigments such as P.R. 88,
metal complex pigments such as P.Y. 117, P.Y. 153, P.Y. 177,
perinone pigments such as P.O. 43, P.R. 194,
flavanthrone pigments such as P.Y. 24, and
anthraquinone pigments such as P.Y. 147 and P.V. 31, for example.

These and other examples of pigments can be found in W. Herbst, K. Hunger, *Industrial Organic Pigments*, VCH Weinheim, 1993.

Using the polymeric dispersants of the invention and the above-described polymeric dispersing additives it is possible to prepare additive d pigments and additive d solid pigment preparations, additive d liquid pigment preparations, and also additive d pigment pastes, by mixing pigments with from 1 to 10% by weight of polymeric dispersant and/or polymeric dispersing additive. An inventive use of the novel dispersants is therefore constituted by pigments or pigment preparations prepared by treating pigments with the above-described polymeric dispersants or polymeric dispersing additives. The present invention likewise provides the additive d pigments and additive d pigment preparations thus obtainable.

The processing of the polymeric dispersants of the invention may be outlined as follows:

Preparation of Solid Pigment Preparations
1.1 Wet Grinding

To prepare solid pigment preparations, 1-50 parts by weight of the abovementioned compounds and 100 parts by weight of pigment from a pigment presscake with a water or solvent content of up to 50% are dispersed in 1-1000 parts by weight of water or solvent (preferably water) with the addition of grinding media (glass or SAZ beads 2-3 mm) in a Skandex disperser (laboratory) or in a stirred ball mill (production operation) for 1-16 hours.

The grinding media are removed by filtration and the aqueous or solvent suspension may be dried, for example, by spraying:

1.1.2 Drying without filtration, coarse comminution

The resulting suspension is concentrated to dryness in a rotary evaporator or drying oven (both laboratory) or in a paddle vacuum drier (production operation). The resultant pigment fragments are coarsely comminuted in a commercial coffee grinder (laboratory) or in a Perplex mill.

1.1.3 Drying After Filtration, Coarse Comminution

The water or solvent (preferably water) is removed by filtration so as to give a solvent-moist presscake. The resulting presscake is dried in a drying oven (laboratory) or on a belt or paddle drier (production operation). This is followed by coarse comminution as mentioned in 1.1.2. Alternatively, the presscake may be freeze dried in a freeze drier.

Wet Coating

Water- or solvent-moist presscakes or aqueous or solvent suspensions from the pigment forming process (crystallization) with 100 parts by weight of pigment are stirred together with 1-50 parts by weight of the polymeric dispersant of the invention. The resulting suspension is processed further as in 1.1.1, 1.1.2 or 1.1.3.

1.3 Dry Pigment Powders are Mixed Mechanically with Selected Polymeric Dispersants of the Invention that are Solid at Room Temperature.

1.4 Dry Crude Pigment is Ground with Selected Polymeric Dispersions of the Invention that are Solid at Room Temperature, with the Addition of Beads.

2. Preparation of Liquid Pigment Preparations

The grinding media are separated from the suspension described under 1.1. A thickener may be added. Additionally, a polyalkylene glycol-type retention aid is added.

3. Preparation of Pigment Pastes
3.1 Dispersion of Solid Pigment Preparations

The solid pigment preparations described in 1 (1-40 parts by weight) are dispersed in a Skandex shaker (laboratory) or a stirred ball mill (production operation) with grinding media (2-3 mm, glass or SAZ) or without grinding media and with 40-400 parts by weight of water or solvent (preferably water).

3.2 Addition of the Additives in Paste Preparation 100 parts by weight of formed pigment powder containing no further additives are dispersed as described in 3.1. During dispersion, 5-30 parts by weight of the polymeric dispersants of the invention are added. The pigment is scattered slowly with stirring into a polymer solution or dispersion and only then is the dispersion process started by adding the grinding media.

4. Makeup

The aqueous pastes described in 3 and the liquid preparations described in 2 are made up with 1K or 2K (one or two component) varnishes. 1K varnishes to be mentioned at this point are those based on alkyd, acrylate, epoxide, polyvinyl acetate, polyester or polyurethane. 2K varnishes to be mentioned include, for example, hydroxyl-containing polyacrylates, or polyester resins and melamine resins, where appropriate with blocked polyisocyanate resins as crosslinkers.

The invention is illustrated by working examples. Unless specified otherwise the solvents used were dried by standard methods: see, for example, Autorenkollektiv Organikum, 3rd reprint of the 15th edition, VEB Verlag der Wissenschaften, Leipzig 1984, section F: Reagents Appendix (page 782-809). Nitrogen was dried by passing it through one $CaCl_2$ and one blue gel drying tower.

1. SYNTHESIS EXAMPLES

Example 1.1

Preparation of a Hyperbranched Polyisocyanate Having an Average NCO Functionality of 7

A reaction vessel equipped with stirrer, dropping funnel, internal thermometer and gas inlet tube was charged with 1 000 g of isophorone diisocyanate while being gassed with dry nitrogen and over the course of 1 minute 300 g of trimethylolpropane in solution in 1 300 g of dry butyl acetate were added with thorough stirring. Following the addition of 0.2 g of dibutyltin dilaurate the reaction mixture was heated to 50° C. and stirred at this temperature and the decrease in the NCO content was monitored by titrimetry in accordance with DIN 53 185. On reaching an NCO content of 7.3% by weight the reaction product had an average functionality in respect of NCO of 2 and in respect of OH of 1. This adduct was then admixed with 650 g of BASONAT® HI 100 in solution in 650 g of dry butyl acetate, and the mixture was heated to 70° C. and stirred at this temperature for 3 h. The end product had an NCO content of 5.9% by weight and a viscosity of 920 mPa·s, measured at 25° C. The average molar mass of the polyisocyanate was 2 609 g/mol, the average functionality based on NCO groups approximately 7.

1.2. Reaction of the Highly Branched Polyisocyanate From 1.1. with Pluriol® A 2000 E and Further Components A 1 l four-necked flask with stirrer, thermometer and reflux condenser was charged with 100 ml of tetrahydrofuran, 57.1 g (10.6 mmol) of highly branched polyisocyanate from 1.1. and 99.5 g (53.3 mmol) of Pluriol® A 2000 E. The isocyanate content of this mixture was 1.20%. Subsequently, with stirring, feed stream 1 (see below) was added. Following the addition of 2 drops (=50 mg) of dibutyltin dilaurate the mixture was heated to 80° C. and held at this temperature until the isocyanate groups had undergone complete reaction.

For feed stream 1 the following substances were employed:

| 1.2.1 | 131.76 g | (22.4 mmol) | Luviskol ® K 17 |
|---|---|---|---|
| 1.2.2 | 6.04 g | (22.4 mmol) | stearylamine |

For workup the contents of the flask were admixed with 400 g of water and the mixture was stirred using a high-speed stirrer with dispersing disk at 2 800 revolutions/min for 5 minutes. Thereafter the tetrahydrofuran was distilled off at 70° C./150 mbar.

1.3. Synthesis of the Hyperbranched Polyurethane 1.3:

A reaction vessel provided with stirrer, internal thermometer, dropping funnel and gas inlet tube was charged with 1 000 g of isophorone diisocyanate (IPDI) under nitrogen blanketing at 23° C. and over the course of 1 minute 300 g of trimethylolpropane (TMP) in solution in 1 300 g of anhydrous 2-butanone were added with thorough stirring. Following the addition of 0.2 g of dibutyltin dilaurate the reaction mixture was heated to 50° C. and stirred at this temperature and the decrease in the NCO content was monitored by titrimetry in accordance with DIN 53 185. When an NCO content of 5.4% by weight had been reached, 147 g of 2,4-tolylene diisocyanate (TDI) were added and the mixture was heated to 60° C. and stirred at this temperature for 1 h. When reaction was over the solution had an NCO content of 5.7% by weight. The calculated average molar mass of the polyisocyanate was 2 420 g/mol, the average functionality 5.9 NCO groups per molecule.

1.4. Synthesis of the Hyperbranched Polyurethane Ammonium Salt 1.4.

In a reaction vessel provided with stirrer and dropping funnel 150 g of anhydrous acetone were added to 150 g of the polyisocyanate from example 1.3 at 23° C. Thereafter, with vigorous stirring, a solution of 18.8 g of β-alanine, 100 g of distilled water, 8.4 g of solid sodium hydroxide and 50 g of acetone was added over the course of 30 s and the reaction mixture was stirred at room temperature for 30 min. The product was subsequently freed from acetone and 2-butanone under reduced pressure on a rotary evaporator, dissolved in 1500 ml of water and precipitated by addition of an excess of 0.1 N aqueous hydrochloric acid. After suction filtration and a single wash with 200 ml of water the product was dried at 50° C. under reduced pressure. Then 29 g of 25% strength aqueous ammonia solution were added to the dry, acid-functional polyurethane, and water was added for dilution to give a 50% strength aqueous solution of the polyurethane ammonium salt 1.4.

1.5. Synthesis of the Hyperbranched Polyurethane Ammonium Salt 1.5.:

In a reaction vessel provided with stirrer, dropping funnel, internal thermometer and gas inlet tube 8 g of hydroxyethyl acrylate and 0.05 g of dibutyltin dilaurate were added under nitrogen blanketing to 150 g of the polyisocyanate from example 1.3 at 23° C., and the mixture was heated to 60° C. and stirred at this temperature for 3 h. Thereafter the mixture was cooled to 23° C. and 150 g of anhydrous acetone were added. Subsequently, with vigorous stirring, a solution of 12.3 g of β-alanine, 100 g of distilled water, 5.5 g of solid sodium hydroxide and 50 g of acetone was added over the course of 30 s and the reaction mixture was stirred at room temperature for 30 min. The product was subsequently freed from acetone and 2-butanone under reduced pressure on a rotary evaporator, dissolved in 1 500 ml of water and precipitated by adding an excess of 0.1 N aqueous hydrochloric acid. Following suction filtration and a single wash with 200 ml of water the product was dried under reduced pressure at 50° C. Then 18 g of 25% by weight aqueous ammonia solution were added to the dry polyurethane, which contained acid groups and acrylic double bonds, and water was added for dilution so as to give a 20% by weight aqueous solution of the polyurethane ammonium salt 1.5.

1.6. Synthesis of the Hyperbranched Polyurethane Ammonium Salt 1.6:

A reaction vessel provided with stirrer, dropping funnel, internal thermometer and gas inlet tube was charged under nitrogen blanketing with 150 g of the polyisocyanate from example 1.3 at 23° C., and 150 ml of anhydrous acetone were added. Then, at room temperature, a solution of 8.9 g of dibutylamine and 10 g of acetone was added slowly-so as not to exceed 30° C. To this mixture there was then added with vigorous stirring a solution of 12.3 g of β-alanine, 100 g of distilled water, 5.5 g of solid sodium hydroxide and 50 g of acetone over the course of 30 s and the reaction mixture was stirred at room temperature for 30 min. The product was then freed from acetone and 2-butanone under reduced pressure on a rotary evaporator, dissolved in 1 500 ml of water and precipitated by adding an excess of 0.1 N aqueous hydrochloric acid. Following suction filtration and a single wash with 200 ml of water the product was dried under reduced pressure at 50° C. 19 g of 25% by weight aqueous ammonia solution were then added to the dry, acid-functional polyurethane and water was added for dilution so as to give a 20% by weight aqueous solution of the polyurethane ammonium salt 1.6.

1.7. Synthesis of the Hyperbranched Polyurethane Ammonium Salt 1.7.:

A reaction vessel provided with stirrer, internal thermometer, dropping funnel and gas inlet tube was charged with 672 g of hexamethylene diisocyanate (HDI) and 672 g of anhydrous dimethylacetamide (DMAc) at 23° C. under nitrogen blanketing. Subsequently, over the course of 10 minutes, a solution of 268 g of trimethylolpropane, 268 g of dimethylolpropionic acid and 1 072 g of anhydrous DMAC was added, with thorough stirring. The reaction mixture was then heated to 70° C. and stirred at this temperature and the decrease in the NCO content was monitored by titrimetry in accordance with DIN 53 185. When the mixture had reached an NCO content of 2.0% by weight 400 g of Pluriol® E 400 (difunctional polyethylene glycol, average molar mass 400 g/mol, BASF Aktiengesellschaft) were added and stirring was continued at 60° C. for 3 h. During this period the NCO content of the mixture fell to 0%. The product was subsequently freed from solvent under a pressure of 1.4 mbar and a jacket temperature of 140° C. in a thin-film evaporator.

The colorless, highly viscose product was adjusted to a pH of 8 using 25% by weight aqueous ammonia solution and subsequently diluted with water to form a 50% strength solution.

2. Tests for Dispersing Properties
General Procedure
In a 50 ml glass bottle the following components were combined:

| | |
|---|---|
| 2.25 g | dispersing additive (calculated for 100% by weight solids content) |
| 1.13 g | 1,2-propylene glycol |
| 0.11 g | Proxel ® XL2 |
| 0.02 g | Etingal ® A |
| 15.83 g | water |

The bottles were sealed and shaken by hand until all of the ingredients had dissolved or were homogeneously dispersed. Then 22.5 g of glass beads with a diameter of 250-420 μm and 2.25 g of color pigment (Hostaperm® Rosa E-WD) were added. The bottles were tightly sealed again and dispersed for 2 hours in a Skandex mixer (type BAS 20). Thereafter the particle size of the dispersion was measured by light scattering in a Malvern Zetasizer (type DTS 5100).

Results:

| Dispersing additive | Particle size [nm] | Polydispersity |
|---|---|---|
| 1.2.1 | 295 | 0.53 |
| 1.2.2 | 276 | 0.11 |
| 1.3. | — | — |
| 1.4. | 213 | 0.12 |
| 1.5. | 226 | 0.20 |
| 1.6. | 269 | 0.07 |
| 1.7. | 236 | 0.17 |
| C 1 (comparative example) | 542 | 0.22 |
| C 2 (comparative example) | 1151 | 0.67 |
| C 3 (comparative example) | 593 | 0.58 |

The desire is for minimum polydispersity in combination with minimum particle size. The polydispersity is determined by the "Zetasizer" instrument.

COMPARATIVE EXAMPLES:

C1 polyurethane prepared according to example C in WO 91/14515, page 35, random, no hyperbranched structures
C2 polyurethane prepared according to U.S. Pat. No. 5,368,944, example 1.1.
C3 polyurethane prepared according to U.S. Pat. No. 5,368,944, example 2

We claim:
1. A process for preparing modified polymeric dispersing additives which comprises reacting a hyperbranched polyurethane having from 2 to 100 NCO groups and a molar mass of from 500 to 50,000 g/mol with one or more polyether derivatives selected from polyethylene glycol derivatives of the formula I

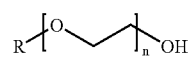

I and polyTHF derivatives of the formula II

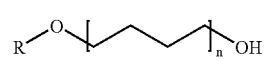

II where in each case
R is selected from hydrogen or $C_1$-$C_{40}$ alkyl or $C_7$-$C_{13}$ aralkyl or $C_6$-$C_{14}$ aryl and
n is an integer from 2 to 500, preferably from 2 to 200, and copolymers of ethylene oxide and propylene oxide or butylene oxide or terpolymers of ethylene oxide and propylene oxide and butylene oxide, it being possible for said polymers to be branched.

2. A process as claimed in claim 1, wherein the polyether derivative is used in a substoichiometric amount relative to the NCO groups of the hyperbranched polyurethane and the unreacted NCO groups are subsequently reacted to pigment affinity groups.

3. A process as claimed in claim 1, wherein the reaction of the NCO groups to pigment affinity groups is carried out with aliphatic or aromatic alcohols, thiols, amines or carboxylic acid derivatives.

4. A modified polymeric dispersing additive obtained by a process of claim 1.

5. A process for preparing polymeric dispersants which comprises reacting a polyurethane with one or more equivalents of a polymer of the formula III $$U\text{-}(M)_y\text{-}T \qquad \text{III}$$

where
U is selected from hydrogen, $C_1$-$C_{18}$ alkyl, $C_7$-$C_{13}$ aralkyl, $C_6$-$C_{14}$ aryl or a radical of a free-radical initiator molecule,
M is identical or different monomer units selected from (meth)acrylic units, acrylamide units, polyvinyl acetate units, polyvinyl alcohol units or polyethyleneimide units, linear polyurethanes, polyester units or polyamide units,
y is an integer from 10 to 100,000, and
T is functional groups which react with the NCO groups or OH groups of the polymeric dispersing additive, and
wherein said polyurethane has a hyperbranched structure and is selected from the group consisting of hyperbranched polyurethanes containing at least one pigment affinity group selected from the group consisting of —COOH, —COOR', —CONHR', —CONH$_2$, —OH, —NH$_2$, —SH, —NHR', —NR'$_2$, —SO$_3$R', —N(phthalimide), —NHCOOR'—NHCONH$_2$, —NH-CONHR' or —CN, the radicals R' being selected from straight-chain or branched alkyl radicals, aralkyl radicals, or aryl radicals, which may be substituted, and hydrophilically modified hyperbranched polyurethanes, the hyperbranched polyurethane(s) being prepared by using one or more AB$_x$ monomers, A being an isocyanate group and B being a group that is reactive with isocyanate, or vice versa, and x being a natural number from 2 to 8.

6. A high-solids coating system comprising a polymeric dispersant prepared by a process as claimed in claim 5.

7. A solventborne coating material comprising a polymeric dispersant prepared by a process as claimed in claim 5.

8. A solvent-free or low-solvent coating material or solvent-free or low-solvent paint comprising a polymeric dispersant prepared by a process as claimed in claim 5.

9. An additive pigment or additive pigment preparation prepared by treatment of pigments with polymeric dispersants prepared by a process as claimed in claim 5.

10. A solvent-free or low-solvent coating material or solvent-free or low-solvent paint comprising a dispersed additive pigment as claimed in claim 9.

11. A waterborne coating material comprising a polymeric dispersant prepared by a process as claimed in claim 5.

* * * * *

UNITED STATES PATENT AND TRADEMARK OFFICE
CERTIFICATE OF CORRECTION

| | | |
|---|---|---|
| PATENT NO. | : 7,268,203 B2 | Page 1 of 1 |
| APPLICATION NO. | : 10/473210 | |
| DATED | : September 11, 2007 | |
| INVENTOR(S) | : Bruchmann et al. | |

It is certified that error appears in the above-identified patent and that said Letters Patent is hereby corrected as shown below:

In claim 5, column 15, indicated line 23: "—NR'$_2$, —SO$_3$R',"
should read, -—NR'$_2$, —SO$_3$H, —SO$_3$R',--

Signed and Sealed this

Twentieth Day of November, 2007

JON W. DUDAS
*Director of the United States Patent and Trademark Office*